(12) United States Patent
Butzhammer et al.

(10) Patent No.: US 12,226,868 B2
(45) Date of Patent: Feb. 18, 2025

(54) DEVICE AND METHOD FOR MEASURING TOOLS

(71) Applicant: DR. JOHANNES HEIDENHAIN GmbH, Traunreut (DE)

(72) Inventors: Michael Butzhammer, Bernau (DE); Robert Goersch, Traunstein (DE); Peter Kolb, Grassau (DE); Josef Mueller, Burghausen (DE); Matthias Riedi, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 177 days.

(21) Appl. No.: 17/973,590

(22) Filed: Oct. 26, 2022

(65) Prior Publication Data
US 2023/0150081 A1    May 18, 2023

(30) Foreign Application Priority Data

Nov. 16, 2021 (DE) ...................... 10 2021 212 866.1

(51) Int. Cl.
*B23Q 17/24* (2006.01)
*G01B 11/00* (2006.01)
(Continued)

(52) U.S. Cl.
CPC ........ *B23Q 17/2457* (2013.01); *G01B 11/005* (2013.01); *G01B 11/026* (2013.01); *G01B 11/03* (2013.01); *G01B 11/2545* (2013.01)

(58) Field of Classification Search
CPC .. B23Q 17/2457; G01B 11/005; G01B 11/02; G01B 11/024; G01B 11/026; G01B 11/03; G01B 11/2433; G01B 11/2545
See application file for complete search history.

(56) References Cited

U.S. PATENT DOCUMENTS 4,688,939 A * 8/1987 Ray .................. G01N 21/95684
                                                  250/559.34
5,058,178 A * 10/1991 Ray ....................... G06T 7/0006
                                                       348/126
(Continued)

FOREIGN PATENT DOCUMENTS

DE      102016224000 A1      6/2018
DE      102018006652 A1      2/2020

OTHER PUBLICATIONS

Shahabi H. H,. et al., Assessment of flank wear and nose radius wear from workpiece roughness profile in turning operation using machine vision, The International Journal of Advanced Manufacturing Technology, Aug. 2008, pp. 11-21, Springer, Berlin, Germany.

*Primary Examiner* — Uzma Alam
*Assistant Examiner* — Jonathon Cook
(74) *Attorney, Agent, or Firm* — LEYDIG, VOIT & MAYER, LTD.

(57) ABSTRACT

A device for determining a dimension of a tool having a cutting edge includes a first light source configured to emit light parallel to a first axis, an image sensor which is associatable with a second axis extending orthogonally to the image sensor and an analyzing unit. The first axis and the second axis are inclined relative to each other. The device is configured such that the light emitted from the first light source is reflectable by the cutting edge of the tool in such a way that light spots arranged in a line on the image sensor are generatable by the reflected light. The analyzing unit is configured to determine positions of the light spots. The dimension of the tool is determinable based on the positions of the light spots.

7 Claims, 3 Drawing Sheets

(51) Int. Cl.
*G01B 11/02* (2006.01)
*G01B 11/03* (2006.01)
*G01B 11/25* (2006.01)

(56) References Cited

U.S. PATENT DOCUMENTS

| | | | | |
|---|---|---|---|---|
| 6,191,856 B1 * | 2/2001 | Slemon | ................ | G01N 21/952 |
| | | | | 356/615 |
| 2003/0184764 A1 * | 10/2003 | Svetkoff | ............ | G01B 11/2545 |
| | | | | 356/602 |
| 2020/0282504 A1 * | 9/2020 | Ziegltrum | .......... | B23Q 17/0919 |

* cited by examiner

DEVICE AND METHOD FOR MEASURING TOOLS

CROSS REFERENCE TO RELATED APPLICATION

This application claims benefit to German Patent Application No. DE 10 2021 212 866.1, filed on Nov. 16, 2021, which is hereby incorporated by reference herein.

FIELD

The invention relates to a device for measuring tools based on an optical principle, as well as to a method for operating the device.

In machining equipment or machine tools, workpieces are often machined using cutting tools. To be able to take the influence of wear-induced changes of the tool shape into account for precise machining, it is common to measure the tools with high accuracy at predetermined intervals. This is frequently done in a measuring machine or in inspection devices outside the machine tool.

BACKGROUND

DE 10 2018 006 652 A1 describes a method for inspecting a tool where a measurement beam from a laser is blocked by the tool. A laser beam receiver emits a signal representative of the extent to which the measurement beam is blocked.

DE 10 2016 224 000 A1 describes a method used detect tool breakage using dark-field illumination.

SUMMARY

In an embodiment, the present invention provides a device for determining a dimension of a tool having a cutting edge. The device includes a first light source configured to emit light parallel to a first axis, an image sensor which is associatable with a second axis extending orthogonally to the image sensor and an analyzing unit. The first axis and the second axis are inclined relative to each other. The device is configured such that the light emitted from the first light source is reflectable by the cutting edge of the tool in such a way that light spots arranged in a line on the image sensor are generatable by the reflected light. The analyzing unit is configured to determine positions of the light spots. The dimension of the tool is determinable based on the positions of the light spots.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
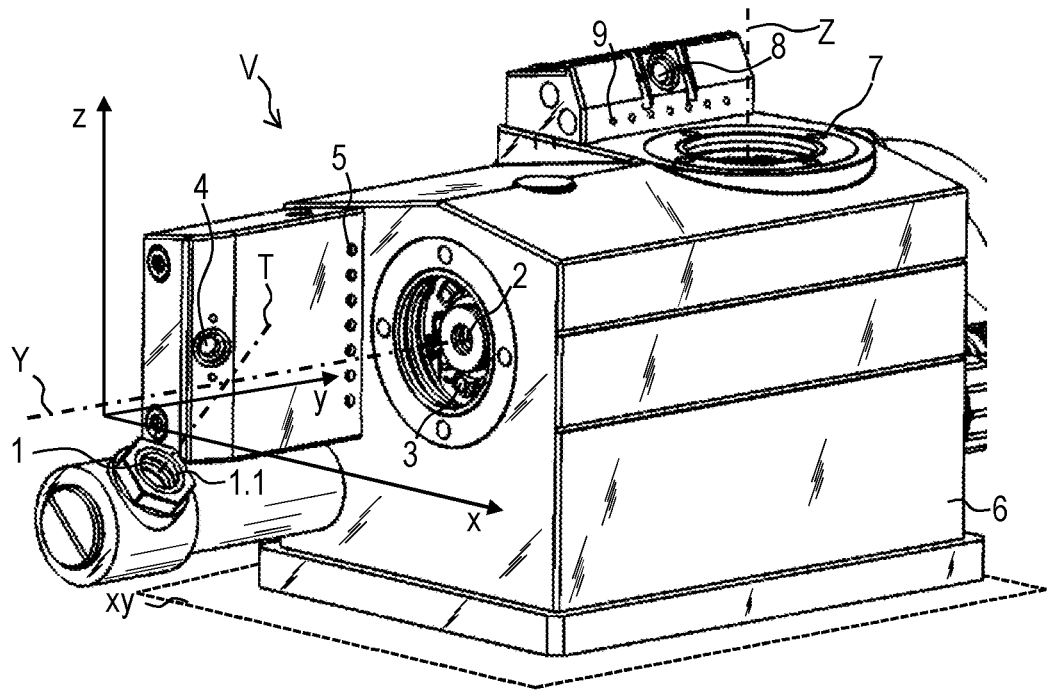
FIG. 1 is a perspective view of the device for determining a dimension of a tool.

Embodiments of the present invention provide a method and device that enable high-accuracy measurement of at least one dimension of a tool having cutting edges, it being possible for the device to be operated in the working area of a piece of machining equipment.

In accordance with an embodiment of the invention, the device is suitable for determining a dimension, such as the relevant diameter or the length of a tool having cutting edges. The device includes a first light source so that light can be emitted from the first light source parallel to a first axis. The device further includes an image sensor which may be associated with a second axis (optical axis) extending orthogonally to the image sensor. Finally, the device includes an analyzing unit; i.e., an electronic circuit for analyzing the signals provided by the image sensor. The first axis and the second axis are inclined relative to each other; i.e., they are in particular not oriented parallel to each other. Furthermore, the device is configured such that light emitted from the first light source can be reflected by the cutting edge of the tool in such a way that the reflected light can generate light spots arranged in a line (or a reflex band) on the image sensor. The analyzing unit is capable of determining positions of the light spots, the dimension of the tool being determinable based on the positions of the light spots on the image sensor.

Thus, the determination of the dimension of the tool is here not performed in a transmitted-light method, where a light source emits light parallel to the optical axis of the image sensor. Rather, the device is configured to allow the use of a dark-field method. This allows the device according to an embodiment of the present invention to be relatively compact, yet operate with a high degree of precision.

The first light source may be configured to emit parallel light beams. In the case of this embodiment, a light source may be used which itself emits parallel light beams or has collimating optics. Alternatively, the first light source may also emit bundled or converging light beams. LEDs, in particular ones having focusing optics, can be used to advantage in this connection. The first axis then preferably passes through the focal point of the first light source.

Advantageously, the device is configured such that at least one reference coordinate can be stored in the analyzing unit, the dimension of the tool being determinable by combining a position of at least one of the light sports with the reference coordinate. The analyzing unit or the respective electronic circuit is preferably located in the device. However, it may also be located outside the device. For example, the analyzing unit may be included in a controller of the machining equipment or disposed in a separate device.

In another embodiment of the invention, the analyzing unit is configured to be capable of determining the dimension of the tool with the aid of a compensation calculation based on the positions of a plurality of light spots.

In a refinement of an embodiment of the invention, the device is configured such that the first axis and the second axis intersect each other. In this context, the angle of intersection between the first axis and the second axis is greater than 75°. Thus, the two axes intersect each other in space in such a manner that two pairs of congruent opposite angles are formed in the plane they define. According to the generally used definitions, the smaller of these two opposite angles is the angle of intersection. Consequently, the angle of intersection of the respective axes in space cannot be greater than 90°. Advantageously, the device is configured such that the angle of intersection between the first axis of and the second axis is 90°.

Preferably, the device is configured such that it is intended to be mounted on a surface of a machine table, which surface extends in a first plane. This first plane is oriented parallel to the second axis, the first light source being disposed such that the first axis extends obliquely to the first plane. Accordingly, the first axis passes through the first plane at an angle different from 90°.

In a further embodiment of the invention, the first axis and the second axis extend in a second plane, the second plane being inclined relative to the first plane by an angle greater than 20°, advantageously greater than 30° or greater than 40°.

Furthermore, the device may include a second image capture unit having a second image sensor which may be associated with a third axis extending orthogonally to the second image sensor and to the second axis.

Another embodiment of the invention provides a method for determining a dimension of a tool having cutting edges. In this method, the light emitted from the first light source is reflected by the cutting edge of the tool in such a way that the reflected light generates light spots arranged in a line on the image sensor. The analyzing unit determines positions of the light spots, and the dimension of the tool is determined based on the positions of the light spots.

Advantageously, the device is mounted in a working area in which a workpiece is machined by the cutting tool at a later stage. After the device is mounted, position values are determined which uniquely define the position of the device in the working area. The required position values can preferably be determined using a contact-type probing method. Based on the position values, reference coordinates are determined for the position of the image sensor and the orientation of the first axis in the working area. Accordingly, once this step is completed, the exact position and orientation of the image sensor in the coordinate system of the working area are known.

Advantageously, a reference body is connected to a tool holder of the machining equipment prior to determining the dimension of the tool. This reference body is then placed in front of the device and measured (i.e., its dimension is determined) with the aid of the image sensor, using the first light source. Preferably, the reference body also has cutting edges or edges that resemble cutting edges. During the subsequent determination of the dimension of the tool, the tool is also connected to the tool holder of the machining equipment. Based on the results of the measurement of the reference body, a correction value is generated which contains information about the exact position of the tool holder relative to the reference coordinates of the image sensor. The correction value is then stored, for example, in the analyzing unit or controller, or in another device.

Advantageously, the tool, in particular one or more cutting edges of the tool, is/are qualitatively assessed prior or subsequent to determining the dimension of the tool. For this purpose, the device may in particular include a second image capture unit having a second image sensor. The second image sensor may be associated with a third (optical) axis extending orthogonally to the second image sensor and to the second axis. This makes it possible to generate another view of the tool.

In accordance with an embodiment of the invention, the device further includes a controller for processing control commands and converting the same into motion sequences of the tool holder in at least one directional axis. In accordance with the further aspect, the device also includes at least one position-measuring device for determining actual positions of the tool holder along the at least one directional axis. The respective actual position values or position signals of the tool holder or of the tool attached thereto are supplied to the controller for position control purposes. During the determination of the dimension of the tool (i.e., outside a machining process), the position-measuring device is used to determine the position of the tool.

Other details and advantages of the inventive device and method will be apparent from the following description of an exemplary embodiment, taken in conjunction with the accompanying drawings.

FIG. 1 shows an exemplary embodiment of the inventive device V. Device V includes a first light source 1, here a laser diode, having a collimator 1.1. During operation of the device, first light source 1 emits light parallel to a first axis T.

Device V further includes an image sensor 2 such as, for example, a CMOS sensor or a CCD sensor. Disposed in front of image sensor 2 is a lens which is configured to allow an entocentric image to be obtained on image sensor 2. Image sensor 2 may be associated with a second axis Y oriented orthogonally to image sensor 2. A second light source 3, which, in the exemplary embodiment presented here, is configured as a ring light formed by a plurality of LEDs arranged around second axis Y, is located radially adjacent to image sensor 2.

Device V is intended to be mounted on a surface of a machine table, which surface extends in a first plane xy. This first plane xy is oriented parallel to second axis Y, the first light source 1 being disposed such that first axis T extends obliquely to first plane xy. In accordance with FIG. 1, first axis T and second axis Y extend in a second plane that is inclined relative to first plane xy. In the exemplary embodiment presented here, the angle between first plane xy and second plane is 45°.

Image sensor 2, including the lens, and second light source 3 are covered by a transparent plate which, in the exemplary embodiment presented here, is circular in shape. Device V is intended to be installed in a working area of machine tool or a piece of machining equipment, where device V is generally likely to be contaminated with coolant/lubricant and/or chips. Such contamination can be effectively removed from the transparent plate using a stream of compressed air issuing at high velocity from nozzles of a first nozzle unit 5. Device V further has a third light source 4.

Moreover, device V includes a second image capture unit 7, shown at the top in FIG. 1. Image capture unit 7 has a second image sensor whose optical axis (hereinafter referred to as third axis Z) is perpendicular to the optical axis of image sensor 2 or to second axis Y. Second image capture unit 7 further includes an in particular ring-shaped light source. For purposes of removing contamination, a second nozzle unit 9, from which a stream of compressed air may issue, is disposed in the region of second image capture unit 7. Furthermore, device V has a fourth light source 8 in the region of second image capture unit 7.

The components of device V are enclosed by a housing 6 which is hermetically sealed and provides protection from external influences. In the exemplary embodiment presented here, housing 6 further has disposed therein an analyzing unit 10 (not shown in FIG. 1, see FIG. 3).

Figure 2:
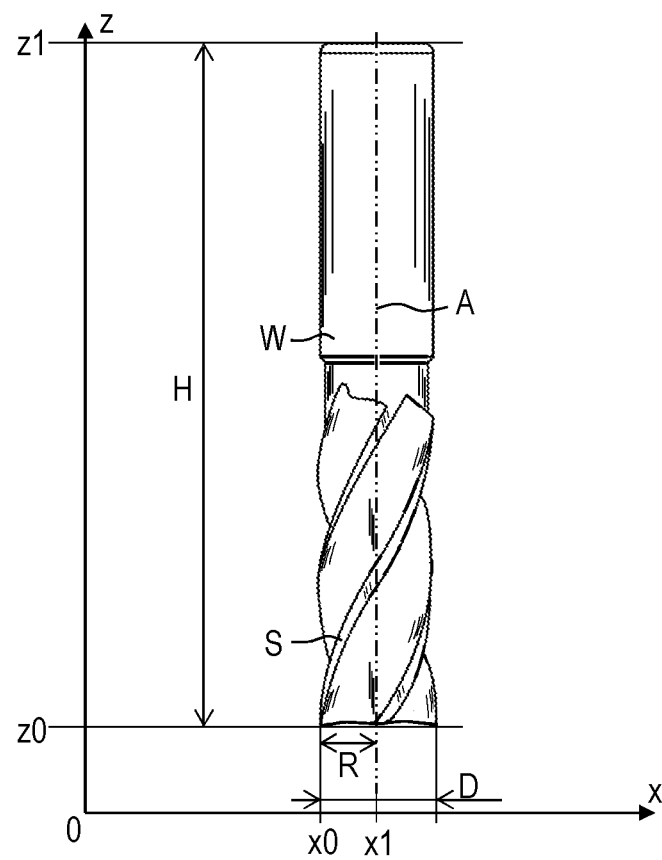
FIG. 2 is a side view of the tool.

FIG. 2 shows a tool W, here a milling cutter having spiral cutting edges S, as well as an associated coordinate system with the directional axes x, y, z. During machining, tool W rotates about a tool axis A. To permit precise machining of workpieces, it is required to determine dimensions D, H (here the diameter and length of tool W) at predetermined intervals because these dimensions change during operation due to wear.

Figure 3:
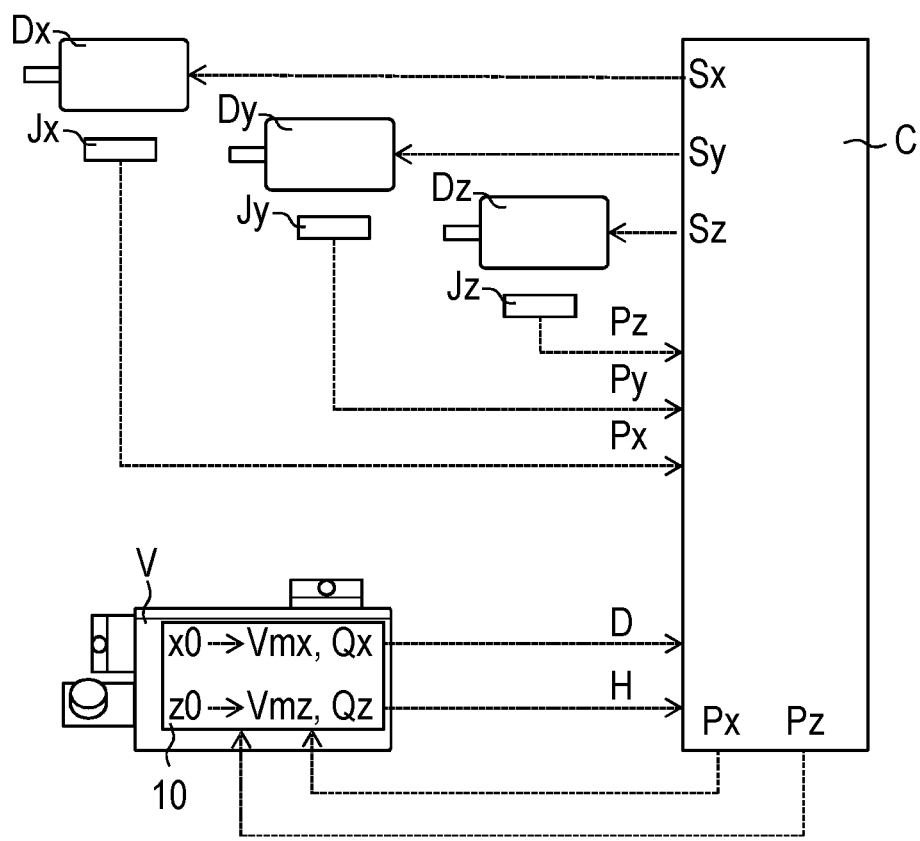
FIG. 3 is a schematic view of a piece of machining equipment, including the controller and the device for determining a dimension of the tool.

FIG. 3 schematically shows elements of the machining equipment, in particular of a machine tool, as well as the device V for determining dimensions D, H of tool W. Accordingly, the machining equipment includes a controller C. Controller C is used, inter alia, to process programmed control commands and convert the same into motion sequences. To this end, controller C transmits control signals Sx, Sy, Sz to drives Dx, Dy, Dz, which cause a tool holder, in particular together with the tool W secured thereto, to be moved along the first directional axis x, a second directional axis Y, and the third directional axis z (FIG. 1) in the working area. The actual positions are sensed by position-measuring devices Jx, Jy, Jz for the respective directional axes x, y, z. The respective actual position values of tool W or position signals Px, Py, Pz are then supplied to controller C for position control purposes, such as is common in CNC machines. Furthermore, such machining equipment may also have more than the three movement axes mentioned above. In order for the material removal to occur exactly at the desired location on the workpiece, the dimensions D, H of tool W must be taken into account in the calculation of control signals Sx, Sy, Sz. Therefore, tools were usually measured outside the working area prior to the beginning of the machining process, and the relevant dimension stored electronically in a table, preferably in controller C.

Figure 4:
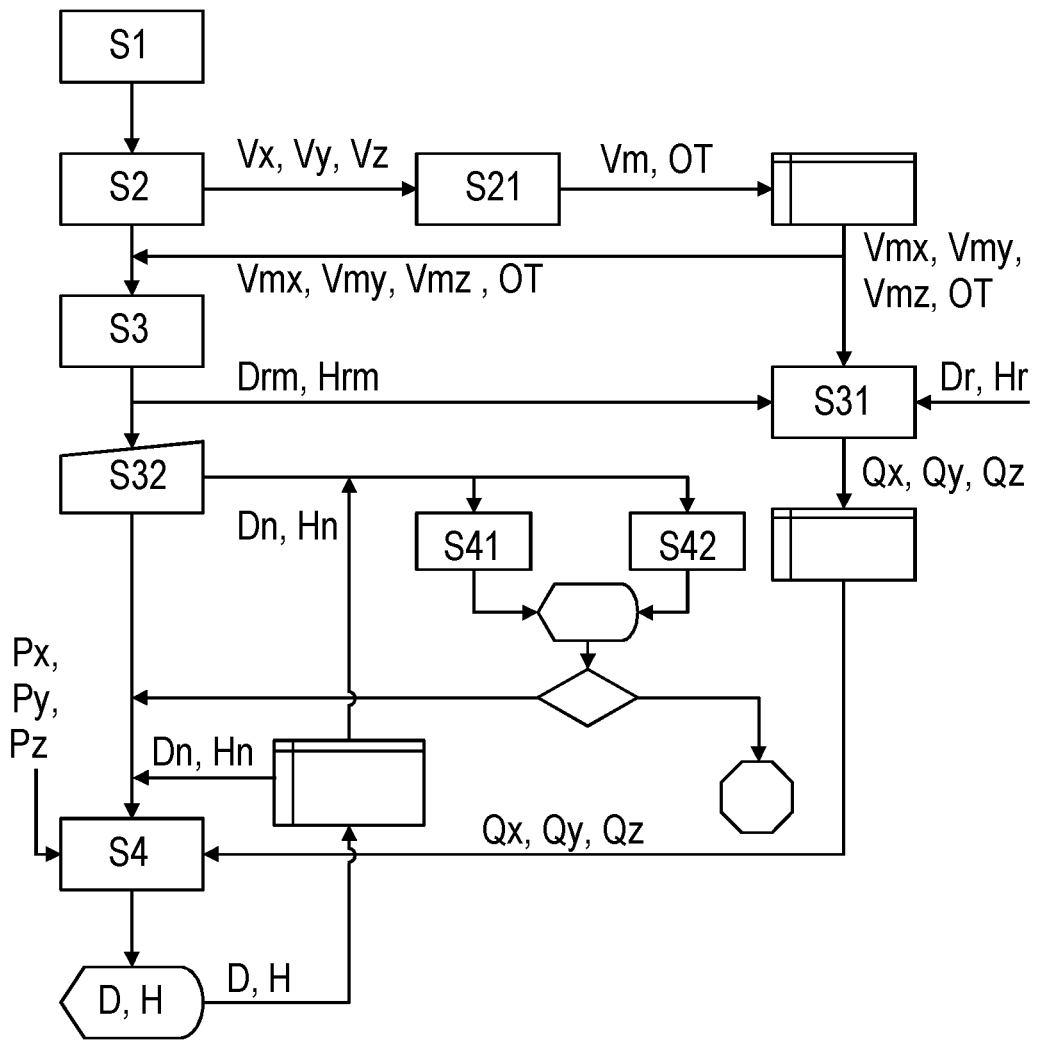
FIG. 4 is flow chart of a method for determining a dimension of the tool.

Embodiments of the invention allow dimensions D, H of the tool W having the cutting edges S to be accurately determined in the working area. To this end, in the illustrated exemplary embodiment, the following steps are performed according to FIG. 4:

Initially, in step S1, device V is introduced into the working area and roughly positioned in a desired location therein, for example on a machining table.

Then, in step S2, a probe is mounted in the tool holder of the machining equipment, and a plurality of predefined points on housing 6 are probed to determine the positions thereof. This process step is performed with the aid of a cycle stored in controller C. This cycle is basically known in the art in connection with the usual measurement of a position of a workpiece blank. The absolute positions of the probed points are determined with the aid of position-measuring devices Jx, Jy, Jz. The so-obtained position values Vx, Vy, Vz of device V are supplied to controller C. Knowing the exact dimensions of device V, the reference coordinates Vmx, Vmy, Vmz of the center of image sensor 2 as well as the orientation OT of axis T can now be determined in the coordinate system of the machining equipment in step 21. If device V remains permanently in the working area of the machining equipment, then the determination of position values Vx, Vy, Vz, and thus step 21, needs to be performed only once after the installation of device V in the working area. Accordingly, under these conditions, step S3 can be initiated immediately after step S2.

In subsequent step S3, after the probe is removed from the tool holder of the machining equipment, a reference body is mounted in the tool holder. This reference body may be, for example, cylindrical in shape and have cutting-type edges parallel to its longitudinal axis and in the circumferential direction. The exact dimensions Dr, Hr of the reference body are known. Then, the reference body is brought to the intended measurement position, taking into account the determined reference coordinates Vmx, Vmy, Vmz of the center of image sensor 2 as well as the orientation OT of first axis T. During the reference measurement, the tool holder preferably rotates with the reference body. Knowing the reference coordinates Vmx, Vmy, Vmz of the center of image sensor 2, the diameter Drm and the height Hrm of the reference body can be determined, analogously to the procedure which will be described below in connection with step S4. In step 31, based on the known dimensions Dr, Hr and the measured dimensions Drm, Hrm of the reference body, correction values Qx, Qy, Qz can be determined and stored, the correction values containing information about the exact position of the tool holder or of the tool axis A relative to the center of image sensor 2 with the reference coordinates Vmx, Vmy, Vmz. Since the described determination of correction values Qx, Qy, Qz is performed while the reference body and the tool holder rotate, errors in connection with the movement about tool axis A are later implicitly also taken into account.

Then, the reference body can be placed in the magazine of the machining equipment, and the tool W to be measured can be mounted in the tool holder.

In step S32, the operator of the machining equipment can choose whether to perform a qualitative assessment of tool W prior to actually determining the dimensions D, H of tool W, for example, in order to check cutting edges S for damage. If a qualitative assessment is selected, then step S41 follows. In step S41, tool W is initially moved into the region of second image capture unit 7. For purposes of and prior to positioning, the nominal dimensions Dn, Hn of tool W are retrieved from a table stored in controller C and read into analyzing unit 10. In the desired position, an image of tool W is then captured, as it were, from below parallel to the z-direction and displayed on a display. Subsequently, in step S42, tool W is positioned in front of image sensor 2, and third light source 4 and first ring light 3 are turned on. Tool W is set into rotation and possibly moved in the z-direction. The images generated by image sensor 2 can be viewed on the display, so that a decision can be made as to whether or not tool W is suitable for machining a workpiece. If not, the method may be aborted at this point, and an alternative tool may be inspected. If tool W is in proper condition, the actual determination of the dimensions D, H of tool W can be started.

Figure 5:
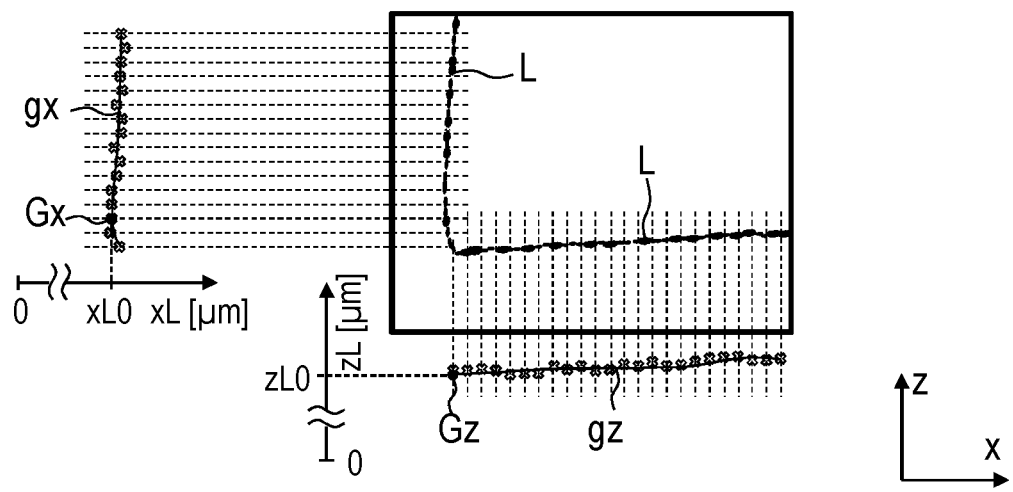
FIG. 5 is a view showing received light spots as well as an analysis chart.

If no qualitative assessment of tool W was chosen in step S32, step S32 is immediately followed by reading the nominal dimensions Dn, Hn (in the case of a new tool W) or the dimensions of tool W measured before the last machining operation from a table stored in controller C. Subsequently, tool W is suitably positioned in front of image sensor 2, and first light source 1 is turned on. In the exemplary embodiment presented here, tool W rotates during the measurement in step S4. During operation of device V, first light source 1, here a laser light source, emits light parallel to first axis T with the aid of collimating optics 1.1. Second axis Y, which extends orthogonally to image sensor 2; i.e., represents the optical axis with respect to image sensor 2, is inclined relative to first axis T. In this way, dark-field illumination is produced. The light emitted from first light source 1 strikes cutting edge S of tool W. In accordance with FIG. 5, light which is reflected by cutting edge S generates light spots L arranged in a line or reflex bands on image sensor 2. FIG. 5 shows the light spots L that are produced by reflection at the bottom left end (see FIG. 2) of the rotating tool W. Since the illumination here is dark-field illumination, the real image is inverted with respect to the representation in FIG. 5. Therefore, in reality, there are bright light spots L in front of a dark background.

The image is then scanned along light spots L in one-pixel-width increments or in a one-pixel-width raster. Accordingly, the distance between each two adjacent dashed lines in FIG. 5 corresponds to one pixel width, which, in the exemplary embodiment presented here, is 8 μm. In particular, light spots L which are in the line that extends substantially in the x-direction are each associated with a z-position in the respective raster. The actual position of tool W in the z-direction is measured by the position-measuring device Jz of the machining equipment, and the corresponding position signal Pz is generated. Thus, it is now possible to determine where light spots L are located relative to the coordinate system in the working area of the machining equipment. In connection with the results of the previously performed reference measurements, in particular taking correction value Qz into account, the absolute value of each z-position zL in the coordinate system of the machining equipment can be defined with very high precision.

Using the respective z-positions zL as input values, analyzing unit 10 performs a compensation calculation, resulting in a spline or a smoothed line gz according to FIG. 5. The point Gz with the position z0 on line gz which has the smallest z-value and which, in the exemplary embodiment presented here, is the leftmost point of line gz is decisive for the determination of the dimension H of the length of tool W. Tool W is mounted in the tool holder in a defined position with respect to the z-direction. Moreover, the position Pz in the z-direction of the tool holder is known form position-measuring device Jz. Thus, taking into account correction value Qz, it is possible to accurately determine the relative position between the stored reference coordinate Vmz and the position z0 of point Gz on image sensor 2.

The dimension D is determined in a similar manner, with tool W rotating during the measurement. Since the actual position of tool W is determined by position-measuring device Jx, and a corresponding positional signal Px is sent to analyzing unit 10, the radius R and thus the dimension D of tool W can then be determined immediately after determining the position x0 of point Gx on image sensor 2. To enhance accuracy, the position of tool axis A is corrected by correction value Qx.

Here, too, analyzing unit 10 performs a compensation calculation, using the respective x-positions xL as input values and producing a smoothed line gx. The point Gx with the coordinate or position x0 on line gx which has the smallest x-value is decisive for the determination of the dimension D of the diameter. In analyzing unit 10, the stored reference coordinate Vmx is combined with the position x0, in particular a difference (Vmx−x0) is formed, this combination determining the dimension D of the diameter of tool W.

Embodiments of the invention have been described with reference to a tool W in the form of an end milling cutter. However, shell-type milling cutters can also be measured. Embodiments of the invention may similarly be used with radius milling cutters, angle milling cutters, double angle milling cutters, etc., where different reflex bands or lines of light spots are generated depending on the particular design. Furthermore, embodiments of the invention may also be used with other tools having cutting edges, such as with drilling tools.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for determining a dimension of a tool having a cutting edge using a device including a first light source, an image sensor, and an analyzing unit, the method comprising:
    emitting, by the light source, light parallel to a first axis, wherein the image sensor is associated with a second axis extending orthogonally to a sensing surface of the image sensor, the first axis and the second axis being inclined relative to each other, and wherein the light emitted from the first light source is reflected by the cutting edge of the tool in such a way that the reflected light generates light spots arranged in a line on the image sensor; and
    determining, by the analyzing unit, positions of the light spots; and
    determining the dimension of the tool based on the positions of the light spots,
    wherein:
    the determining of the dimension is aided by a compensation calculation based on the positions of the light spots,
    prior to determining the dimension of the tool, a reference body is connected to a tool holder of the machining equipment and measured using the image sensor, and
    during subsequent determination of the dimension of the tool, the tool is connected to the tool holder of the machining equipment and, based on the results of the measurement of the reference body, a correction value is generated which contains information about an exact position of the tool holder relative to reference coordinates of the image sensor.

2. The method as recited in claim 1, wherein the device is mounted in a working area, and, subsequently, position values are determined which uniquely define the position of the device in the working area, wherein, based on the position values, reference coordinates are determined for the position of the image sensor and an orientation of the first axis in the working area.

3. The method as recited in claim 1, wherein the dimension of the tool is determined based on the positions of the light spots, taking into account the correction value.

4. The method as recited in claim 1, further comprising qualitatively assessing the cutting edge of the tool.

5. The method as recited in claim 4, wherein the device includes a second image sensor associated with a third axis extending orthogonally to the second image sensor and to the second axis.

6. The method as recited in claim 1, wherein the reference body has cutting edges or edges that resemble cutting edges.

7. The method as recited in claim 1, wherein the reference body is cylindrical in shape and has cutting-type edges parallel to a longitudinal axis of the reference body and in a circumferential direction of the reference body.

* * * * *